(12) United States Patent
Liu et al.

(10) Patent No.: US 10,097,365 B2
(45) Date of Patent: Oct. 9, 2018

(54) CONTROL METHOD, APPARATUS, SERVER AND TERMINAL DEVICE OF TELEPRESENCE CONFERENCE

(71) Applicant: Huawei Technologies Co., Ltd, Shenzhen (CN)

(72) Inventors: Yan Liu, Shenzhen (CN); Weiwei Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 343 days.

(21) Appl. No.: 15/143,188

(22) Filed: Apr. 29, 2016

(65) Prior Publication Data
US 2016/0248597 A1  Aug. 25, 2016

Related U.S. Application Data

(63) Continuation of application No. PCT/CN2014/089905, filed on Oct. 30, 2014.

(30) Foreign Application Priority Data

Oct. 30, 2013  (CN) .......................... 2013 1 0530501

(51) Int. Cl.
*G06F 15/16* (2006.01)
*H04L 12/18* (2006.01)
(Continued)

(52) U.S. Cl.
CPC ...... *H04L 12/1827* (2013.01); *H04L 12/1822* (2013.01); *H04L 51/043* (2013.01); *H04L 65/4038* (2013.01); *H04L 67/18* (2013.01)

(58) Field of Classification Search
CPC ............ H04L 12/1827; H04L 12/1822; H04L 51/043; H04L 65/4038; H04L 67/18
(Continued)

(56) References Cited

U.S. PATENT DOCUMENTS

2006/0092269 A1  5/2006  Baird et al.
2008/0069011 A1  3/2008  Sekaran et al.
(Continued)

FOREIGN PATENT DOCUMENTS

CN  1705336 A  12/2005
CN  1849824 A  10/2006
(Continued)

OTHER PUBLICATIONS

Romanow et al., "Framework for Telepresence Multi-Streams," CLUE WG, Internet Draft, draft-ietf-clue-framework-06.txt, pp. 1-35, IETF Trust, Reston, Virginia (Jul. 6, 2012).
(Continued)

*Primary Examiner* — Philip B Tran
(74) *Attorney, Agent, or Firm* — Leydig, Voit & Mayer, Ltd.

(57) ABSTRACT

The present disclosure relates to the technical field of communications. Disclosed are a control method, an apparatus, a server and a terminal device of a telepresence conference. The method comprises: a server receiving a conference control policy message sent by a terminal device that is provided with a management permission; the server, based on geographical location information and role information of a conference control object, determining a media stream message corresponding to the conference control object; and the server controlling the media stream message corresponding to the conference control object based on a media type and a conference estate locking trigger condition of conference control content.

15 Claims, 6 Drawing Sheets

(51) Int. Cl.
*H04L 12/58* (2006.01)
*H04L 29/06* (2006.01)
*H04L 29/08* (2006.01)

(58) Field of Classification Search
USPC .................................................. 709/204, 203
See application file for complete search history.

(56) References Cited

U.S. PATENT DOCUMENTS

| | | | |
|---|---|---|---|
| 2008/0151785 A1* | 6/2008 | Sylvain ............. | H04M 3/42017 370/260 |
| 2009/0051756 A1* | 2/2009 | Trachtenberg ......... | H04N 7/142 348/14.08 |
| 2009/0164575 A1 | 6/2009 | Barbeau et al. | |
| 2010/0073454 A1* | 3/2010 | Lovhaugen ........... | G06F 3/0486 348/14.03 |
| 2010/0296634 A1* | 11/2010 | Schulzrinne ......... | H04M 3/5116 379/45 |
| 2011/0137993 A1* | 6/2011 | Yi ....................... | H04L 12/1822 709/204 |
| 2011/0271192 A1 | 11/2011 | Jones et al. | |
| 2011/0280128 A1 | 11/2011 | Nakajima | |
| 2012/0069133 A1 | 3/2012 | Wu | |
| 2012/0092444 A1 | 4/2012 | Mackie et al. | |
| 2012/0216129 A1 | 8/2012 | Ng et al. | |
| 2012/0236106 A1* | 9/2012 | Wu ....................... | H04M 3/567 348/14.07 |
| 2014/0063177 A1* | 3/2014 | Tian ......................... | H04N 7/15 348/14.07 |
| 2014/0139618 A1* | 5/2014 | Ye .......................... | H04N 7/147 348/14.09 |

FOREIGN PATENT DOCUMENTS

| | | |
|---|---|---|
| CN | 101583011 A | 11/2009 |
| CN | 102137061 A | 7/2011 |
| CN | 102904733 A | 1/2013 |

OTHER PUBLICATIONS

"Series H: Audiovisual and Mulitimeida Systems; Infrastructure of audiovisual services—Systems and terminal equipment for audiovisual services; Narrow-band visual telephone systems and terminal equipment," ITU-T Recommendation H.320, pp. i-26, International Telecommunication Union, Geneva, Switzerland (Mar. 2004).

"Series H: Audiovisual and Mulitimedia Systems; Infrastructure of audiovisual services—Systems and terminal equipment for audiovisual services; Packet-based multimedia communications systems; Amendment 1: Use of Facility message to enable call transfer," Recommendation of ITU-T H.323 (2009)—Amendment 1, pp. i-1, International Telecommunication Union, Geneva, Switzerland (Mar. 2013).

* cited by examiner

Syntax of FCI Entry in the Conference Control message

US 10,097,365 B2

CONTROL METHOD, APPARATUS, SERVER AND TERMINAL DEVICE OF TELEPRESENCE CONFERENCE

CROSS-REFERENCE TO RELATED APPLICATIONS

This application is a continuation of International Patent Application No. PCT/CN2014/089905, filed on Oct. 30, 2014, which claims priority to Chinese Patent Application No. 201310530501.6, filed on Oct. 30, 2013, both of which are hereby incorporated by reference in their entireties.

TECHNICAL FIELD

The present disclosure relates to the technical field of communications, and in particular to a method and apparatus for controlling a telepresence conference, and a server and a terminal device.

BACKGROUND

With the continuous development of network technology, telepresence conferences are becoming an important form of conference. Telepresence conferences are convened over a network by combining video, audio and interactive components, thereby overcoming inconvenience caused by region differences.

In addition to high quality of audio and video effect and a conference site closing to reality, the telepresence conference can provide a conference control strategy to control a series of functions of the conference such as silencing/muting, disabling/enabling a video, and locking/unlocking.

In implementing the present disclosure, it has been appreciated by the inventor that there is at least the following issues in the conventional technologies.

In the conventional technologies, a telepresence conference can only silence/mute a single participant, disable/enable a video for the single participant, and lock/unlock the whole conference. Therefore, a conference control strategy is single and media streams can not be distinguished effectively in a case that a Realtime Transport Protocol is multiplexed in a multi-stream conference.

SUMMARY

In order to address the issue of the conference control strategy being single, embodiments of the present disclosure provide a method and an apparatus for controlling a telepresence conference. And the technical solutions are as follows.

In a first aspect, a method for controlling a telepresence conference includes:

receiving, by a server, a conference control strategy message transmitted by a terminal device with managing authority, where the conference control strategy message includes geographical position information and role information of a conference control object, a media type of conference control content and a triggering condition for locking conference status;

determining, by the server, a media stream message corresponding to the conference control object based on the geographical position information and the role information of the conference control object; and controlling, by the server, the media stream message corresponding to the conference control object based on the media type of the conference control content and the triggering condition for locking conference status.

According to the first aspect, in a first possible implementation of the first aspect, before the controlling, by the server, the media stream message corresponding to the conference control object based on the media type of the conference control content and the triggering condition for locking conference status, the method may further include:

receiving, by the server, a media stream message transmitted by at least one terminal device, the media stream message including at least a 5-Tuple and a synchronization source identifier.

According to the first possible implementation of the first aspect, in a second possible implementation of the first aspect, in a case that a realtime transport protocol is multiplexed, the determining, by the server, a media stream message corresponding to the conference control object based on the geographical position information and the role information of the conference control object may include:

acquiring, by the server, a capture identifier of the media stream message corresponding to the conference control object based on the geographical position information and the role information of the conference control object in the conference control strategy message;

acquiring, by the server, a synchronization source identifier of the media stream message corresponding to the conference control object based on a session description protocol and the capture identifier of the media stream message corresponding to the conference control object; and determining, by the server, the media stream message corresponding to the conference control object based on the synchronization source identifier of the media stream message corresponding to the conference control object and the synchronization source identifier of the received media stream message.

According to the first possible implementation of the first aspect, in a third possible implementation of the first aspect, in a case that a realtime transport protocol is not multiplexed, the determining, by the server, a media stream message corresponding to the conference control object based on the geographical position information and the role information of the conference control object may include:

acquiring, by the server, a 5-Tuple corresponding to the conference control object based on the geographical position information and the role information of the conference control object in the conference control strategy message; and determining, by the server, the media stream message corresponding to the conference control object based on the 5-Tuple corresponding to the conference control object and the 5-Tuple of the received media stream message.

According to the first aspect, in a fourth possible implementation of the first aspect, after the receiving a conference control strategy message transmitted by a terminal device with managing authority, the method may include:

transmitting a conference control strategy response message to the terminal device with managing authority.

According to the first aspect or any one of the possible implementations of the first aspect, in a fifth possible implementation of the first aspect, the conference control strategy message may be transported in a realtime transport control protocol packet.

In a second aspect, a method for controlling a telepresence conference includes:

displaying, by a terminal device with managing authority, a conference control strategy option;

generating, by the terminal device with managing authority, a conference control strategy message in response to an operation of a user, where the conference control strategy message includes geographical position information and role information of a conference control object, a media type of conference control content and a triggering condition for locking conference status; and transmitting, by the terminal device with managing authority, the conference control strategy message to a server.

According to the second aspect, in a first possible implementation of the second aspect, after the transmitting, by the terminal device with managing authority, the conference control strategy message to a server, the method may include:

receiving, by the terminal device with managing authority, a conference control strategy response message transmitted by the server.

According to the second aspect or the first possible implementation of the second aspect, in a second possible implementation of the second aspect, the conference control strategy message may be transported in a realtime transport control protocol packet.

In a third aspect, an apparatus for controlling a telepresence conference includes:

a first reception module configured to receive, by a server, a conference control strategy message transmitted by a terminal device with managing authority, wherein the conference control strategy message includes geographical position information and role information of a conference control object, a media type of conference control content and a triggering condition for locking conference status;

a determination module configured to determine, by the server, a media stream message corresponding to the conference control object based on the geographical position information and the role information of the conference control object; and a control module configured to control, by the server, the media stream message corresponding to the conference control object based on the media type of the conference control content and the triggering condition for locking conference status.

According to the third aspect, in a first possible implementation of the third aspect, the apparatus may further include:

a second reception module configured to receive, by the server, a media stream message transmitted by at least one terminal device, the media stream message including at least a 5-Tuple and a synchronization source identifier.

According to the first possible implementation of the third aspect, in a second possible implementation of the third aspect, in a case that a realtime transport protocol is multiplexed, the determination module may include:

a capture identifier acquisition unit configured to acquire, by the server, a capture identifier of the media stream message corresponding to the conference control object based on the geographical position information and the role information of the conference control object in the conference control strategy message;

a synchronization source identifier acquisition unit configured to acquire, by the server, a synchronization source identifier of the media stream message corresponding to the conference control object based on a session description protocol and the capture identifier of the media stream message corresponding to the conference control object; and a first determination unit configured to determine, by the server, the media stream message corresponding to the conference control object based on the synchronization source identifier of the media stream message corresponding to the conference control object and the synchronization source identifier of the received media stream message.

According to the first possible implementation of the third aspect, in a third possible implementation of the third aspect, in a case that a realtime transport protocol is not multiplexed, the determination module may include:

a 5-Tuple acquisition unit configured to acquire, by the server, a 5-Tuple corresponding to the conference control object based on the geographical position information and the role information of the conference control object in the conference control strategy message; and a second determination unit configured to determine, by the server, the media stream message corresponding to the conference control object based on the 5-Tuple corresponding to the conference control object and the 5-Tuple of the received media stream message.

According to the third aspect, in a fourth possible implementation of the third aspect, the apparatus may further include:

a transmission module configured to transmit, by the server, a conference control strategy response message to the terminal device with managing authority.

According to the third aspect or any one of possible implementations of the third aspect, in a fifth possible implementation of the third aspect, the conference control strategy message may be transported in a realtime transport control protocol packet.

In a fourth aspect, an apparatus for controlling a telepresence conference includes:

a display module configured to display, by a terminal device with managing authority, a conference control strategy option;

a conference strategy message generation module configured to generate, by the terminal device with managing authority, a conference control strategy message in response to an operation of a user, where the conference control strategy message includes geographical position information and role information of a conference control object, a media type of conference control content and a triggering condition for locking conference status; and a transmission module configured to transmit, by the terminal device with managing authority, the conference control strategy message to a server.

According to the fourth aspect, in a first possible implementation of the fourth aspect, the apparatus may further include:

a reception module configured to receive, by the terminal device with managing authority, a conference control strategy response message transmitted by the server.

According to the fourth aspect or the first possible implementation of the first aspect, in a second possible implementation of the fourth aspect, the conference control strategy message may be transported in a realtime transport control protocol packet.

In a fifth aspect, a server includes a transmitter and a processor, where the receiver is configured to receive, by the server, a conference control strategy message transmitted by a terminal device with managing authority, where the conference control strategy message includes geographical position information and role information of a conference control object, a media type of conference control content and a triggering condition for locking conference status;

the processor is configured to determine, by the server, a media stream message corresponding to the conference control object based on the geographical position information and the role information of the conference control object; and the processor is further configured to control, by the server, the media stream message corresponding to the conference control object based on the media type of the conference control content and the triggering condition for locking conference status.

According to the fifth aspect, in a first possible implementation of the first aspect, the server may further include a receiver, where the receiver is configured to receive, by the server, a media stream message transmitted by at least one terminal device, the media stream message including at least a 5-Tuple and a synchronization source identifier.

According to the first possible implementation of the fifth aspect, in a second possible implementation of the fifth aspect, in a case that a realtime transport protocol is multiplexed, the processor may be configured to: acquire, by the server, a capture identifier of the media stream message corresponding to the conference control object based on the geographical position information and the role information of the conference control object in the conference control strategy message; acquire, by the server, a synchronization source identifier of the media stream message corresponding to the conference control object based on a session description protocol and the capture identifier of the media stream message corresponding to the conference control object; and determine, by the server, the media stream message corresponding to the conference control object based on the synchronization source identifier of the media stream message corresponding to the conference control object and the synchronization source identifier of the media stream message.

According to the first possible implementation of the fifth aspect, in a third possible implementation of the fifth aspect, in a case that a realtime transport protocol is not multiplexed, the processor may be configured to: acquire, by the server, a 5-Tuple corresponding to the conference control object based on the geographical position information and the role information of the conference control object in the conference control strategy message; and determine, by the server, the media stream message corresponding to the conference control object based on the 5-Tuple corresponding to the conference control object and the 5-Tuple of the media stream message.

According to the fifth aspect, in a fourth possible implementation of the fifth aspect, the transmitter may be further configured to transmit, by the server, a conference control strategy response message to the terminal device with managing authority.

According to the fifth aspect or any one of possible implementations of the fifth aspect, in a fifth possible implementation of the fifth aspect, the conference control strategy message may be transported in a realtime transport control protocol packet.

In a sixth aspect, a terminal device with managing authority includes: a display, a processor and a transmitter, where, the display is configured to display, by the terminal device with managing authority, a conference control strategy option;

the processor is configured to generate, by the terminal device with managing authority, a conference control strategy message in response to an operation of a user, where the conference control strategy message includes geographical position information and role information of a conference control object, a media type of conference control content and a triggering condition for locking conference status; and the transmitter is configured to transmit, by the terminal device with managing authority, the conference control strategy message to a server.

According to the sixth aspect, in a first possible implementation of the sixth aspect, the device may further include a receiver, where, the receiver is configured to receive, by the terminal device with managing authority, a conference control strategy response message transmitted by the server.

According to the sixth aspect or any one of possible implementations of the sixth aspect, in a second possible implementation of the sixth aspect, the conference control strategy message may be transported in a realtime transport control protocol packet.

In a seventh aspect, a system for controlling a telepresence conference includes the server according to the above fifth aspect or any one of the possible implementations of the fifth aspect and the terminal device with managing authority according to the above sixth aspect or any one of the possible implementations of the sixth aspect.

The technical solutions according to the embodiments of the present disclosure have the following advantages.

In the method and apparatus for controlling a telepresence conference according to the embodiments of the present disclosure, a conference control strategy message transmitted by a terminal device with managing authority is received, where the conference control strategy message includes geographical position information and role information of a conference control object, the media type of the conference control content and the triggering condition for locking conference status. A media stream message corresponding to the conference control object is determined based on the geographical position information and the role information of the conference control object. And the media stream message corresponding to the conference control object is controlled based on the media type of the conference control content and the triggering condition for locking conference status. With the technical solutions according to the embodiments of the present disclosure, the media stream message is controlled based on the geographical position information and the role information of the conference control object, the media type and the triggering condition for locking conference status, thereby controlling multiple participants differentially, diversifying the conference control strategy and addressing the problem of distinguishing media streams in a case that the realtime transport protocol is multiplexed.

BRIEF DESCRIPTION OF THE DRAWINGS

The drawings to be used in the description of the embodiments will be described briefly as follows, so that the technical solutions according to the embodiments of the present disclosure will become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

In the following, the embodiments of the present disclosure are described in detail in conjunction with the drawings, in order that the objectives, technical solutions and advantages of the present disclosure are clearer.

Figure 1:
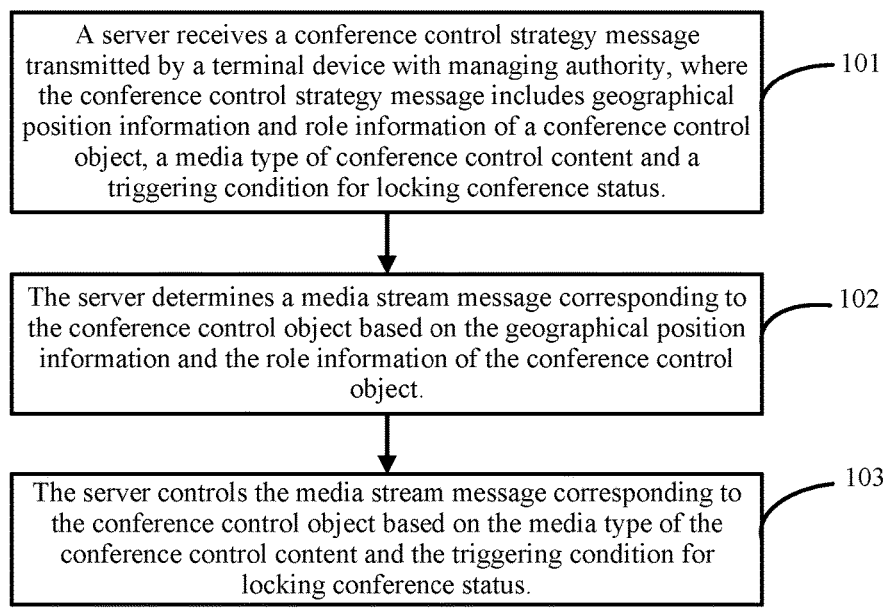
FIG. 1 is a flowchart of a method for controlling a telepresence conference according to an embodiment of the present disclosure.

FIG. 1 is a flowchart of a method for controlling a telepresence conference according to an embodiment of the present disclosure. And an executive subject of the embodiment of the present disclosure is a server. Referring to FIG. 1, the method is as follows.

In 101, a conference control strategy message transmitted by a terminal device with managing authority is received by the server, where the conference control strategy message includes geographical position information and role information of a conference control object, a media type of conference control content and a triggering condition for locking conference status.

The managing authority is an authority for operating and using a certain function of a system. In an embodiment of the present disclosure, the managing authority is an authority for controlling a telepresence conference.

The managing authority for a telepresence conference includes but is not limited to:

I. silencing/muting: silencing/muting at least one terminal device;

II. opening/closing a video: opening/closing a video on at least one terminal device; and III. locking/unlocking a conference: locking/unlocking the whole conference site based on information such as the role of the terminal device, the number of participants and the duration of the conference.

Based on roles of terminal devices, the server determines which terminal device has managing authority. For example, if the role of a terminal device is 'Chairman' or 'Manager', the terminal device has the managing authority; and other terminal devices, of which roles are respectively 'Audience', 'Secretary', 'Lecturer' and the like, do not have the managing authority and can not control the telepresence conference.

As compared with the conventional technologies, the conference control strategy message according to the embodiment of the present disclosure includes at least the geographical position information and the role information of the conference control object, the media type of the conference control content and the triggering condition for locking conference status.

The media type of the conference control content and the triggering condition for locking conference status include but are not limited to:

I. media type 'media': taking the media type of a participant as conference control content, such as 'audio', 'video', 'data' or 'all', where 'audio' represents audio, 'video' represents video, 'data' represents data, and 'all' represents all media types.

II. conference status 'status': taking conference status of a conference site as conference control content, that is, locking the status of the current conference site and disallowing other participants to attend the conference, where the triggering condition for locking conference status includes at least one of participants 'participant' and the duration of the conference 'duration of conference'.

Specifically, 'participant' adopts a wildcard mechanism. As shown in Table 1, in a case that 'participant' is 65535, the triggering condition for locking conference status only relates to the duration of conference but not relating to the participants. In a case that 'participant' is 65534, the triggering condition for locking conference status relates to the participants but not relating to the number of current participants, and the conference is locked/unlocked based on the conference control strategy message. In a case that 'participant' is less than 65534, the conference is locked/unlocked based on the conference control strategy message when the number of the current participants reaches the value of 'participant'.

TABLE 1

Wildcard mechanism of 'participant'

| participant | Processing strategy |
|---|---|
| 65535 | The triggering condition for locking conference status does not relate to participants |
| 65534 | The triggering condition for locking conference status does not relate to the number of current participants, and the conference is locked/unlocked based on the conference control strategy message |
| less than 65534 | The conference is locked/unlocked based on the conference control strategy message when the number of current participants reaches the value |

Specifically, 'duration of conference' adopts a wildcard mechanism. As shown in Table 2, in a case that 'duration of conference' is null, the triggering condition for locking conference status only relates to the participants but not relating to the duration of the current conference. In a case that 'duration of conference' is zero, the triggering condition for locking conference status does not relate to the duration of the current conference, and the conference is locked/unlocked based on the conference control strategy message. In a case that 'duration of conference' is greater than zero, the conference is locked/unlocked based on the conference control strategy message when the duration of the conference reaches the value of the 'duration of conference'.

TABLE 2

Wildcard mechanism of 'duration of conference'

| duration of conference | Processing strategy |
|---|---|
| null | The triggering condition for locking conference status does not relate to the duration of the current conference |
| 0 | The triggering condition for locking conference status does not relate to the duration of the current conference, and the conference is locked/unlocked based on the conference control strategy message |
| greater than 0 | The conference is locked/unlocked based on the conference control strategy message when the duration of the conference reaches the value |

The conference control object attributes mainly include but not limited to the following three aspects:

I. geographical position information 'site', where the conference is controlled based on geographical position information of conference sites. For example, if the whole conference includes three participants: 'shenzhen', 'guangzhou' and 'shanghai', the conference is controlled differentially based on geographical position information of the three respective participants;

II. role information 'role', where the conference is controlled based on role information of participants, with the role information including but not limited to 'Manager', 'Chairman', 'Secretary', 'Lecturer', 'Audience' and 'All', and the conference is controlled differentially based on the role information of the participants in the conference sites;

III. geographical position information 'site' and role information 'role', where the conference is controlled based on geographical position information and role information of a conference control object.

A newly-added conference control object strategy further includes enabling the chosen conference control content and disabling the chosen conference control content.

The conference control strategy message may be transported in a form of XML (extensible markup language) or in a form of RTCP (realtime transport control protocol) packet, which is not limited in the embodiments of the disclosure. In order to make those skilled in the art further understand the form of the conference control strategy message, description is given by taking transporting the conference control strategy message in the form of XML as an example. For example:

```
<m:Conference_Control >
    <m:object>   // conference control object, i.e. taking 'Audience'
role in 'shenzhen' conference site as a conference control object
        <m: site>shenzhen</m:site>   // taking 'shenzhen'
conference site as a conference control object
        <m: role> Audience </m:role>   //taking 'Audience' role
as a conference control object
    </m: object >
    <m:context> //conference control content
        <m: media>audio</m:media> //controlling an audio stream
        <m:status>//i.e. locking/unlocking conference status when the
duration of the conference reaches 5m
            <m: participant >65535</m: participant >
            <m: duration of conference >5m</ duration of conference >
        </m:status>
    </m: context>
    </m:policy>on</m:policy> // starting conference control
</m: Conference_Control>
```

In the example, the conference control strategy received by the server is to: silence a participant with a natural role of 'Audience' in 'shenzhen' conference site and lock the conference status when the duration for the participant with the natural role of 'Audience' in 'shenzhen' conference site to attend the conference reaches 5 m.

In 102, a media stream message corresponding to the conference control object is determined by the server based on the geographical position information and the role information of the conference control object.

The media stream message corresponding to the conference control object is determined by server based on the geographical position information and the role information of the conference control object, in the following two manners depending on whether an RTP (realtime transport protocol) is multiplexed.

(1) In a case that the RTP is not multiplexed, based on the geographical position information and the role information of the conference control object in the received conference control strategy message, the server acquires a 5-Tuple, which corresponds to the geographical position information and the role information, in a CLUE (ControLling mUltiple streams for tElepresence) mechanism. And the server determines a media stream message corresponding to the conference control object based on the 5-Tuple. The CLUE is used for processing interaction and negotiation of multi-stream information in a telepresence conference. Information such as geographical position information, role information, a 5-Tuple and Capture ID information and a correspondence between these types of information are defined in the CLUE mechanism. RTP being not multiplexed means that the transported media stream message is in a single format, for example, the transported media stream message is only in one of file formats such as picture, text and audio.

(2) In a case that RTP is multiplexed, based on the geographical position information and the role information of the conference control object in the received conference control strategy message, the server acquires a media stream message corresponding to a conference control object which corresponds to the geographical position information and the role information, respectively in the CLUE and a session description protocol (SDP). The session description protocol is a media session description provided for a session notification, a session invitation and an initialization of a media session in other forms. RTP being multiplexed means that the transported media stream message is in multiple formats. For example, the transported media stream message is in two or more of file formats such as picture, text and audio.

The server distinguishes media streams by determining the media stream message corresponding to the conference control object.

In 103, the media stream message corresponding to the conference control object is controlled by the server based on the media type of the conference control content and the triggering condition for locking conference status.

The server controls the media stream message corresponding to the conference control object based on the media type of the conference control content and the triggering condition for locking conference status, so as to differentially control silencing/muting and opening/closing a video for different participants, and achieve control function including locking/unlocking a conference and so on.

According to the example in step 101, silencing control is performed in the step on the media stream message corresponding to the conference control object, i.e. the media stream message with a media type of 'audio' to be transmitted to a participant in 'shenzhen' conference site whose natural role is 'Audience'. The conference status is locked when the participant whose natural role is 'Audience' in 'shenzhen' site attends the conference for 5 m.

In the method for controlling a telepresence conference according to the embodiment of the present disclosure, a conference control strategy message transmitted by a terminal device with managing authority is received. The conference control strategy message includes geographical position information and role information of a conference control object, the media type of the conference control content and the triggering condition for locking conference status. A media stream message corresponding to the conference control object is determined based on the geographical position information and the role information of the conference control object. And the media stream message corresponding to the conference control object is controlled based on the media type of the conference control content and the triggering condition for locking conference status. With the technical solutions according to the embodiment of the present disclosure, the media stream message is controlled based on the geographical position information and the role information of the conference control object, the media type and the triggering condition for locking conference status, thereby controlling multiple participants differentially, diversifying the conference control strategy, and addressing the problem of distinguishing media streams in a case that the realtime transport protocol is multiplexed.

Figure 2A:
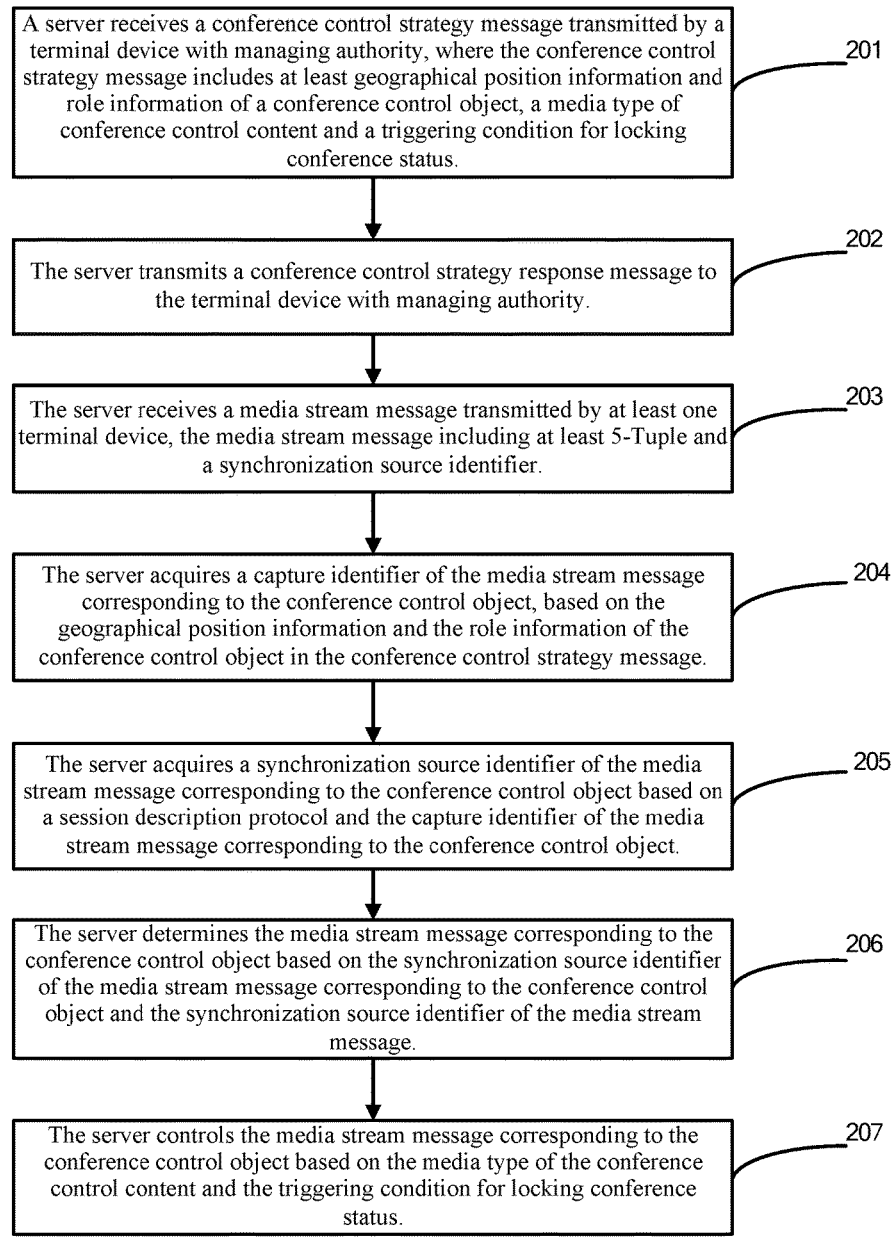
FIG. 2a is a flowchart of a method for controlling a telepresence conference according to an embodiment of the present disclosure.

FIG. 2a is a flowchart of a method for controlling a telepresence conference according to an embodiment of the present disclosure. In the embodiment, multiplexing the realtime transport protocol is taken as an example. An executive subject according to the embodiment of the present disclosure is a server. Referring to FIG. 2a, the method is as follows.

In 201, a conference control strategy message transmitted by a terminal device with managing authority is received by the server, where the conference control strategy message includes geographical position information and role information of a conference control object, a media type of conference control content and a triggering condition for locking conference status.

In a case that the conference control strategy message is transported in a realtime transport control protocol packet, feedback control information (FCI) of the realtime transport control protocol is expanded. Expanded information includes but is not limited to geographical position information 'site' and role information 'role' of a conference control object, the media type of conference control content, 'media', and the triggering condition for locking conference status. The triggering condition for locking conference status includes participants 'participant' and the duration of the conference 'duration of conference'.

Figures 2B, 3:
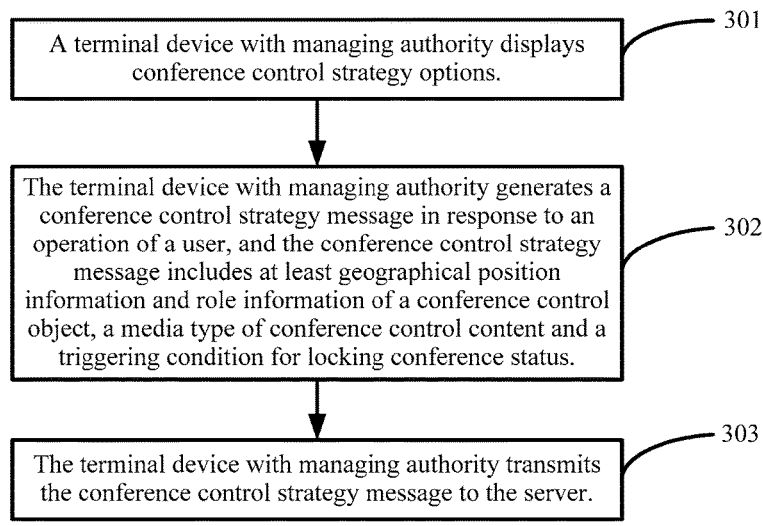
FIG. 2b is a schematic diagram of expansion of feedback control information of a realtime transport control protocol according to an embodiment of the present disclosure.
FIG. 3 is a flowchart of a method for controlling a telepresence conference according to an embodiment of the present disclosure.

In order to make those skilled in the art further understand the expanded fields of the realtime transport control protocol, FIG. 2b shows a schematic diagram of expansion of the feedback control information of realtime transport control protocol according to an embodiment of the present disclosure. Referring to FIG. 2b, 'object type' (4 bits) represents the type of a conference control object, i.e. 'site' and 'role'; 'context type' (4 bits) represents the type of conference control content, i.e. 'media', 'participant' and 'duration of conference'; 'policy type' (4 bits) represents the type of a conference control strategy message, i.e. 'off' and 'on'; 'res' (4 bits) is reserved; 'parameter len' (8 bits) represents the length of 'type specific'; 'control ID' (8 bits) represents the sequence number of the conference control strategy message; and 'type specific' (variable) represents the feedback type of the conference control strategy message.

The server receives the realtime transport control protocol packet transmitted by the terminal device with managing authority, and acquires the conference control strategy message by parsing the realtime transport protocol.

In 202, a conference control strategy response message is transmitted to the terminal device with managing authority by the server.

Upon reception of the conference control strategy message transmitted by the terminal device with managing authority, the server transmits the conference control strategy response message to the terminal device with managing authority. In this way, a participant corresponding to the terminal device with managing authority may learn that the conference control strategy message is transmitted successfully and is received by the server.

In 203, a media stream message transmitted by at least one terminal device is received by the server, the media stream message including at least a 5-Tuple and a synchronization source identifier.

The 5-Tuple is a set including a source IP address, a source port, a target IP address, a target port and a transport layer protocol number. For example, 192.168.1.1 10000 TCP 121.14.88.76 80 composes a 5-Tuple. It means that a terminal with an IP address of 192.168.1.1 transmits a message to a terminal having a target IP address of 121.14.88.76 and a port of 80, via a port 10000 using the TCP protocol.

The length of the synchronization source identifier (SSRC) field is 32 bits, for identifying the source of an RTP information packet corresponding to the media stream message. RTP information packets corresponding to media stream messages in an RTP session each have a clear SSRC.

In a telepresence conference, at least one terminal device transmits a media stream message to the server, the media stream message being transported in a form of RTP. The server receives the media stream message transmitted by the at least one terminal device, and processes the media stream message based on the conference control strategy message, so as to control the conference.

In 204, a capture identifier of the media stream message corresponding to the conference control object is acquired by the server based on the geographical position information and the role information of the conference control object in the conference control strategy message.

The capture identifier of the media stream message corresponding to the conference control object is the identifier of a device for capturing the media stream message corresponding to the conference control object, such as a camera, a microphone and so on.

In a case that the RTP (real-time transport protocol) is multiplexed, various media stream messages of the terminal device, such as audio, video and data, are delivered via one port. Therefore, upon reception of the media streams of at least terminal device, the server can not determine the media stream message corresponding to the conference control object based on the 5-Tuple.

In the CLUE mechanism, geographical position information and role information correspond to the capture identifier of the media stream message, 'Capture ID'. The server acquires the capture identifier, 'Capture ID', of the media stream message corresponding to the conference control object according to the CLUE mechanism, based on the geographical position information and the role information of the conference control object in the conference control strategy message. The CLUE is used for processing interaction and negotiation of multi-stream information in a telepresence conference. And information such as the geographical position information, role information, a 5-Tuple and 'Capture ID' information and a correspondence between the types of information are defined in the CLUE mechanism.

In 205, a synchronization source identifier of the media stream message corresponding to the conference control object is acquired by the server based on a session description protocol and the capture identifier of the media stream message corresponding to the conference control object.

The session description protocol SDP includes the correspondence between the SSRC and the capture identifier 'Capture ID' of the capturing device.

The server acquires the synchronization source identifier of the media stream message corresponding to the conference control object based on the correspondence between the SDP and the capture identifier of the media stream message corresponding to the conference control object.

In 206, the media stream message corresponding to the conference control object is determined by the server based on the synchronization source identifier of the media stream message corresponding to the conference control object and the synchronization source identifier of the received media stream message.

The server determines whether the synchronization source identifier of the media stream message corresponding to the conference control object is the same as the synchronization source identifier of the received media stream message. It is determined that the received media stream message is not the media stream message corresponding to the conference control object if the synchronization source identifier of the media stream message corresponding to the conference control object is not the same as the synchronization source identifier of the received media stream message. It is determined that the received media stream message is the media stream message corresponding to the conference control object if the synchronization source identifier of the media stream message corresponding to the conference control object is the same as the synchronization source identifier of the received media stream message.

Steps 204 to 206 are processes for determining the media stream message corresponding to the conference control object based on the geographical position information and the role information of the conference control object.

It should be noted that, in another embodiment of the present disclosure, in a case that the realtime transport protocol is not multiplexed, the determining the media stream message corresponding to the conference control object based on the geographical position information and the role information of the conference control object may include: acquiring a 5-Tuple corresponding to the conference control object based on the session description protocol, the role information and the geographical position information of the conference control object in the conference control strategy message; and determining the media stream message corresponding to the conference control object based on the 5-Tuple corresponding to the conference control object and the 5-Tuple of the media stream message. The process is well known by those skilled in the art and is not described herein.

In 207, the media stream message corresponding to the conference control object is controlled by the server based on the media type of the conference control content and the triggering condition for locking conference status.

The server controls the media stream message corresponding to the conference control object based on the media type of the conference control content. For example, in a case that the media type is audio 'audio', a message with a media type of audio 'audio' is filtered out from media stream messages to be transmitted to the conference control object, so as to control the conference control object in audio.

The server determines whether the duration of the conference and participants of the conference meet the triggering condition for locking conference status based on the triggering condition for locking conference status, and locks the conference status in a case that the duration of the conference and participants of the conference meet the triggering condition for locking conference status.

In the method for controlling a telepresence conference according to the embodiment of the present disclosure, a conference control strategy message transmitted by a terminal device with managing authority is received. The conference control strategy message includes geographical position information and role information of the conference control object, the media type of the conference control content and the triggering condition for locking conference status. A media stream message corresponding to the conference control object is determined based on the geographical position information and the role information of the conference control object. And the media stream message corresponding to the conference control object is controlled based on the media type of the conference control content and the triggering condition for locking conference status. With the technical solutions according to the embodiment of the present disclosure, the media stream message is controlled based on the geographical position information and the role information of the conference control object, the media type and the triggering condition for locking conference status, thereby controlling multiple participants differentially, diversifying the conference control strategy, and addressing the problem of distinguishing media streams in a case that the realtime transport protocol is multiplexed.

FIG. 3 is a flowchart of a method for controlling a telepresence conference according to an embodiment of the present disclosure. An executive subject according to the embodiment of the present disclosure is a terminal device with managing authority. Referring to FIG. 3, the method is as follows.

In 301, conference control strategy options are displayed by the terminal device with managing authority.

The conference control strategy options include a geographical location option and a role option of a conference control object, and options of a media type of conference control content and a triggering condition for locking conference status.

The conference control strategy options are displayed on a display screen by the terminal device with managing authority, so that a user sets the conference control strategy according to the conference control strategy options, thereby controlling at least one conference terminal, for example, silencing/muting, opening/closing a video, and controlling to open/close a video for the at least one conference terminal.

In 302, a conference control strategy message is generated by the terminal device with managing authority in response to the operation of the user. The conference control strategy message includes at least the geographical position information and the role information of the conference control object, the media type of the conference control content and the triggering condition for locking conference status.

In response to the operation of the user, the terminal device acquires conference control strategy options set by the user, such as the geographical location option and the role option of the conference control object and the options of the media type of the conference control content and the triggering condition for locking conference status, and generates a conference control strategy message. The conference control strategy message may be in a form of XML, or a RTCP packet, and is not limited in the embodiment of the present disclosure.

In 303, the conference control strategy message is transmitted to the server by the terminal device with managing authority.

The server is configured to receive a media stream transmitted by at least one terminal device and the conference control strategy message transmitted by the terminal device with managing authority and is capable of processing the conference control strategy message.

The terminal device with managing authority transmits the conference control strategy message to the server via a network, so that the server controls terminal devices participating in the conference after receiving the conference control strategy message.

In the method for controlling a telepresence conference according to the embodiment of the present disclosure, the conference control strategy options are displayed by the terminal device with managing authority. A conference control strategy message is generated by the terminal device with managing authority in response to the operation of the user, with the conference control strategy message including geographical position information and role information of a conference control object, a media type of conference control content and a triggering condition for locking conference status. And the terminal device with managing authority transmits the conference control strategy message to the server. With the technical solutions according to the embodiment of the present disclosure, it is generated the conference control strategy message including the geographical position information and the role information of the conference control object, the media type of the conference control content and the triggering condition for locking conference status, thereby controlling multiple participants differentially and diversifying the conference control strategy.

Figure 4:
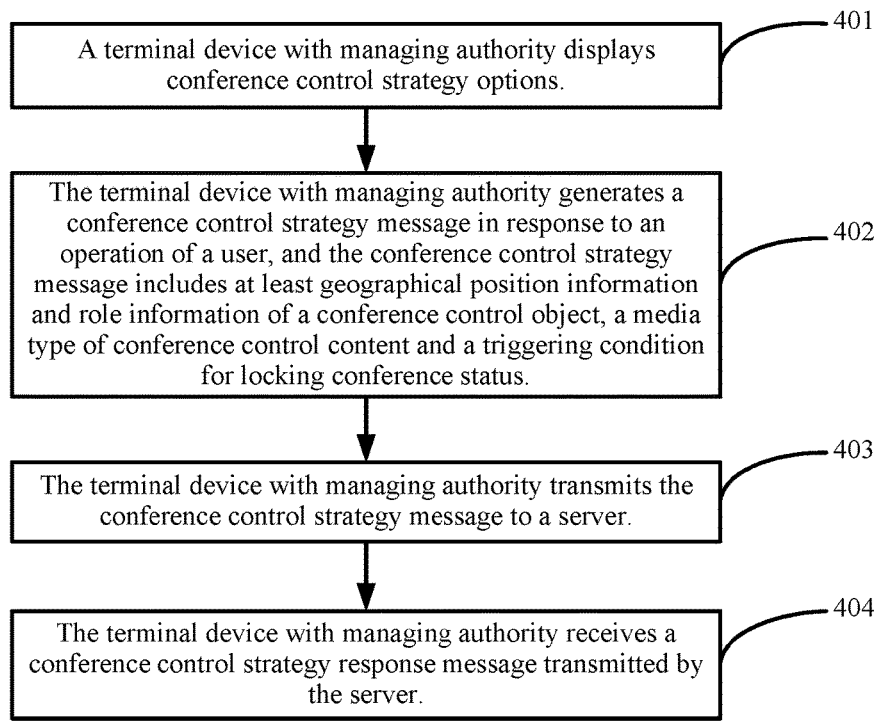
FIG. 4 is flowchart of a method for controlling a telepresence conference according to an embodiment of the present disclosure.

FIG. 4 is a flowchart of a method for controlling a telepresence conference according to an embodiment of the present disclosure. An executive subject of the embodiment of the present disclosure is a terminal device with managing authority. Referring to FIG. 4, the method is as follows.

In 401, conference control strategy options are displayed by the terminal device with managing authority.

The terminal device with managing authority displays the conference control strategy options at a preset location on a display. The preset location may be set in designing by a skilled man, or may be set by a user as needed, which is not limited herein.

After the conference control strategy options are displayed at the preset location on the display by the terminal device with managing authority, the user may set a conference control strategy message based on the conference control strategy options, by touching a screen, by operating remotely or by inputting, which is not limited herein.

In 402, a conference control strategy message is generated by the terminal device with managing authority in response to the operation of the user. The conference control strategy message includes geographical position information and role information of a conference control object, a media type of conference control content and a triggering condition for locking conference status.

The conference control strategy message is transported in a realtime transport control protocol packet.

In response to the operation of the user, the terminal device acquires the conference control strategy options, adds a geographical location option, a role option and options of the media type of the conference control content and the triggering condition for locking conference status from the conference control strategy options into the expanded bits of the feedback control information of RTCP, to generate a conference control strategy message. For a specific form of the conference control strategy message, reference may be made to FIG. 2b, which is not described herein.

In 403, the conference control strategy message is transmitted to the server by the terminal device with managing authority.

After generating the conference control strategy message, the terminal device with managing authority transmits the conference control strategy message to the server in a form of a realtime transport control protocol packet. In this way, after receiving the conference control strategy message, the server may control the telepresence conference based on the conference control strategy message and transmit a response message to the terminal device with managing authority.

In 404, a conference control strategy response message transmitted by the server is received by the terminal device with managing authority.

The terminal device with managing authority receives the conference control strategy response message transmitted by the server, so that the participant corresponding to the terminal device with managing authority may learn that the conference control strategy message is transmitted successfully and is received by the server.

In the method for controlling the telepresence conference according to the embodiment of the present disclosure, the conference control strategy options are displayed by the terminal device with managing authority. A conference control strategy message is generated by the terminal device with managing authority in response to the operation of the user, with the conference control strategy message including geographical position information and role information of the conference control object, a media type of conference control content and a triggering condition for locking conference status. And the terminal device with managing authority transmits the conference control strategy message to the server. With the technical solutions according to the embodiment of the present disclosure, it is generated the conference control strategy message including the geographical position information and the role information of the conference control object, the media type of the conference control content and the triggering condition for locking conference status, thereby controlling multiple participants differentially and diversifying the conference control strategy.

Figure 5:
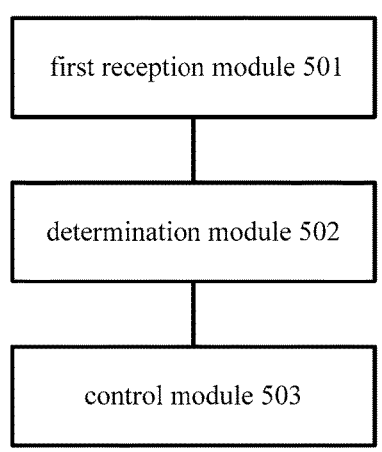
FIG. 5 is a schematic structural diagram of an apparatus for controlling a telepresence conference according to an embodiment of the present disclosure.

FIG. 5 is a schematic structural diagram of an apparatus for controlling a telepresence conference according to an embodiment of the present disclosure. Referring to FIG. 5, the apparatus includes:

a first reception module 501 configured to receive, by a server, a conference control strategy message transmitted by a terminal device with managing authority, wherein the conference control strategy message at least includes geographical position information and role information of a conference control object, a media type of conference control content and a triggering condition for locking conference status;

a determination module 502 configured to determine, by the server, a media stream message corresponding to the conference control object based on the geographical position information and the role information of the conference control object; and a control module 503 configured to control, by the server, the media stream message corresponding to the conference control object based on the media type of the conference control content and the triggering condition for locking conference status.

The apparatus further includes:

a second reception module configured to receive, by the server, a media stream message transmitted by at least one terminal device, the media stream message including at least a 5-Tuple and a synchronization source identifier.

In a case that a realtime transport protocol is multiplexed, the determination module 502 includes:

a capture identifier acquisition unit configured to acquire, by the server, a capture identifier of the media stream message corresponding to the conference control object based on the geographical position information and the role information of the conference control object in the conference control strategy message;

a synchronization source identifier acquisition unit configured to acquire, by the server, a synchronization source identifier of the media stream message corresponding to the conference control object based on a session description protocol and the capture identifier of the media stream message corresponding to the conference control object; and a first determination unit configured to determine, by the server, the media stream message corresponding to the conference control object based on the synchronization source identifier of the media stream message corresponding to the conference control object and the synchronization source identifier of the received media stream message.

In another embodiment of the present disclosure, in a case that the realtime transport protocol is not multiplexed, the determination module 502 includes:

a 5-Tuple acquisition unit configured to acquire, by the server, a 5-Tuple corresponding to the conference control object based on the geographical position information and the role information of the conference control object in the conference control strategy message; and a second determination unit configured to determine, by the server, the media stream message corresponding to the conference control object based on the 5-Tuple corresponding to the conference control object and the 5-Tuple of the media stream message.

The apparatus further includes: a transmission module configured to transmit, by the server, a conference control strategy response message to the terminal device with managing authority.

The conference control strategy message is transported in a realtime transport control protocol packet.

In the apparatus for controlling a telepresence conference according to the embodiment of the present disclosure, a conference control strategy message transmitted by a terminal device with managing authority is received. The conference control strategy message includes at least geographical position information and role information of the conference control object, the media type of the conference control content and the triggering condition for locking conference status. A media stream message corresponding to the conference control object is determined based on the geographical position information and the role information of the conference control object. And the media stream message corresponding to the conference control object is controlled based on the media type of the conference control content and the triggering condition for locking conference status. With the technical solutions according to the embodiment of the present disclosure, the media stream message is controlled based on the geographical position information and the role information of the conference control object, the media type and the triggering condition for locking conference status, thereby controlling differentially multiple participants, diversifying the conference control strategy, and addressing the problem of distinguishing media streams in a case that the realtime transport protocol is multiplexed.

It should be noted that, the apparatus for controlling the telepresence conference according to the embodiment is only an example for explaining a division of the above function modules when controlling the telepresence conference. In an actual application, the above functions may be completed by different modules as needed. That is, an inner structure of the device is divided into different function modules to complete all of or parts of the above functions. In addition, the apparatus for controlling the telepresence conference according to the above embodiment has a same concept as the embodiments of the method for controlling the telepresence conference. Thus, for a specific implementation of the apparatus, reference may be made to the embodiment of the method and is not described herein.

Figure 6:
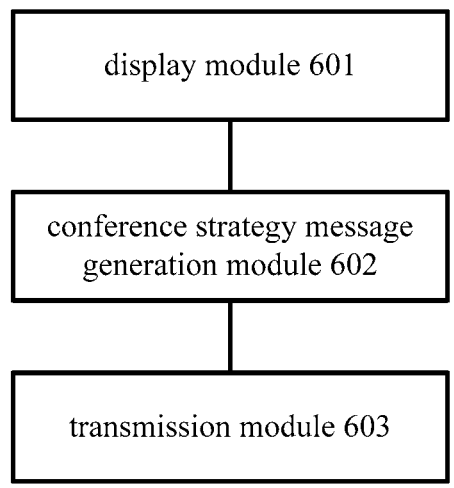
FIG. 6 is a schematic structural diagram of an apparatus for controlling a telepresence conference according to an embodiment of the present disclosure.

FIG. 6 is a schematic structural diagram of an apparatus for controlling a telepresence conference according to an embodiment of the present disclosure. Referring to FIG. 6, the apparatus includes:

a display module 601 configured to display, by a terminal device with managing authority, a conference control strategy option;

a conference strategy message generation module 602 configured to generate, by the terminal device with managing authority, a conference control strategy message in response to an operation of a user, wherein the conference control strategy message includes at least geographical position information and role information of a conference control object, a media type of conference control content and a triggering condition for locking conference status; and a transmission module 603 configured to transmit, by the terminal device with managing authority, the conference control strategy message to a server.

The apparatus further includes:

a reception module configured to receive, by the terminal device with managing authority, a conference control strategy response message transmitted by the server.

The conference control strategy message is transported in a realtime transport control protocol packet.

In the apparatus for controlling a telepresence conference according to the embodiment of the present disclosure, the conference control strategy options are displayed by the terminal device with managing authority. A conference control strategy message is generated by the terminal device with managing authority in response to the operation of the user, with the conference control strategy message including at least geographical position information and role information of a conference control object, a media type of conference control content and a triggering condition for locking conference status. And the conference control strategy message is transmitted to the server by the terminal device with managing authority. With the technical solutions according to the embodiment of the present disclosure, it is generated the conference control strategy message including the geographical position information and the role information of the conference control object, the media type of the conference control content and the triggering condition for locking conference status, thereby controlling multiple participants differentially and diversifying the conference control strategy.

It should be noted that, the apparatus for controlling the telepresence conference according to the embodiment is only an example for explaining a division of the above function modules when controlling the telepresence conference. In an actual application, the above functions may be completed by different modules as needed. That is, an inner structure of the device is divided into different function modules to complete all of or parts of the above functions. In addition, the apparatus for controlling the telepresence conference according to the above embodiment has a same concept as the embodiments of the method for controlling the telepresence conference. Thus, for a specific implementation of the apparatus, reference may be made to the embodiment of the method and is not described herein.

Figure 7:
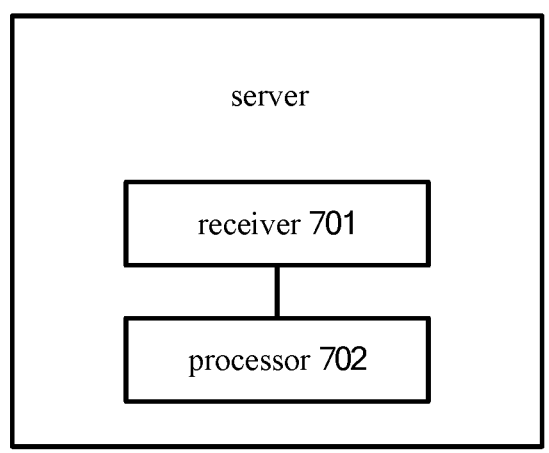
FIG. 7 is a schematic structural diagram of a server according to an embodiment of the present disclosure.

FIG. 7 is a schematic structural diagram of a server according to an embodiment of the present disclosure. Referring to FIG. 7, the server includes a receiver 701 and a processor 702.

The receiver 701 is configured to receive, by the server, a conference control strategy message transmitted by a terminal device with managing authority, wherein the conference control strategy message includes at least geographical position information and role information of a conference control object, a media type of conference control content and a triggering condition for locking conference status.

The processor 702 is configured to determine, by the server, a media stream message corresponding to the conference control object based on the geographical position information and the role information of the conference control object.

The processor 702 is further configured to control, by the server, the media stream message corresponding to the conference control object based on the media type of the conference control content and the triggering condition for locking conference status.

The processor 702 according to an embodiment of the present disclosure may be a central processing unit CPU, or may be configured as one or more integrated circuits for implementing the embodiment of the present disclosure.

The receiver is configured to receive, by the server, a media stream message transmitted by at least one terminal device, the media stream message including at least a 5-Tuple and a synchronization source identifier.

In a case that a realtime transport protocol is multiplexed, the processor 702 is configured to: acquire, by the server, a capture identifier of the media stream message corresponding to the conference control object based on the geographical position information and the role information of the conference control object in the conference control strategy message; acquire, by the server, a synchronization source identifier of the media stream message corresponding to the conference control object based on a session description protocol and the capture identifier of the media stream message corresponding to the conference control object; and determine, by the server, the media stream message corresponding to the conference control object based on the synchronization source identifier of the media stream message corresponding to the conference control object and the synchronization source identifier of the received media stream message.

In another embodiment of the present disclosure, in a case that the realtime transport protocol is not multiplexed, the processor 702 is configured to: acquire, by the server, a 5-Tuple corresponding to the conference control object based on the geographical position information and the role information of the conference control object in the conference control strategy message; and determine, by the server, the media stream message corresponding to the conference control object based on the 5-Tuple corresponding to the conference control object and the 5-Tuple of the media stream message.

The server further includes a transmitter.

The transmitter is configured to transmit, by the server, a conference control strategy response message to the terminal device with managing authority.

The conference control strategy message is transported in a realtime transport control protocol packet.

In the server according to the embodiment of the present disclosure, a conference control strategy message transmitted by a terminal device with managing authority is received. The conference control strategy message includes at least geographical position information and role information of the conference control object, the media type of conference control content and the triggering condition for locking conference status. A media stream message corresponding to the conference control object is determined based on the geographical position information and the role information of the conference control object. And the media stream message corresponding to the conference control object is controlled based on the media type of the conference control content and the triggering condition for locking conference status. With the technical solutions according to the embodiment of the present disclosure, the media stream message is controlled based on the geographical position information and the role information of the conference control object, the media type and the triggering condition for locking conference status, thereby controlling differentially multiple participants, diversifying the conference control strategy, and addressing the problem of distinguishing media streams in a case that the realtime transport protocol is multiplexed.

Figure 8:
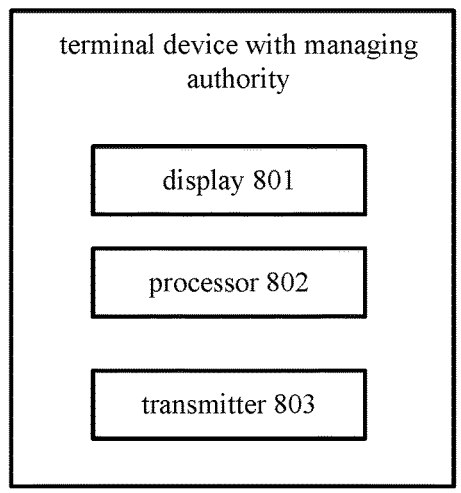
FIG. 8 is a schematic structural diagram of a terminal device with managing authority according to an embodiment of the present disclosure.

FIG. 8 is a schematic structural diagram of a terminal device with managing authority according to an embodiment of the present disclosure. Referring to FIG. 8, the terminal device includes a display 801, a processor 802 and a transmitter 803.

The display 801 is configured to display, by the terminal device with managing authority, a conference control strategy option.

The processor 802 is configured to generate, by the terminal device with managing authority, a conference control strategy message in response to an operation of a user, wherein the conference control strategy message includes at least geographical position information and role information of a conference control object, a media type of conference control content and a triggering condition for locking conference status.

The transmitter 803 is configure do transmit, by the terminal device with managing authority, the conference control strategy message to a server.

The apparatus further includes a receiver.

The receiver is configured to receive, by the terminal device with managing authority, a conference control strategy response message transmitted by the server.

The conference control strategy message is transported in a realtime transport control protocol packet.

In the terminal device with managing authority according to the embodiment of the present disclosure, the conference control strategy options are displayed by the terminal device with managing authority. A conference control strategy message is generated by the terminal device with managing authority in response to the operation of the user, with the conference control strategy message including at least geographical position information and role information of a conference control object, a media type of conference control content and a triggering condition for locking conference status. And the conference control strategy message is transmitted to the server by the terminal device with managing authority. With the technical solutions according to the embodiment of the present disclosure, it is generated the conference control strategy message including the geographical position information and the role information of the conference control object, the media type of the conference control content and the triggering condition for locking conference status, thereby controlling multiple participants differentially and diversifying the conference control strategy.

Figure 9:
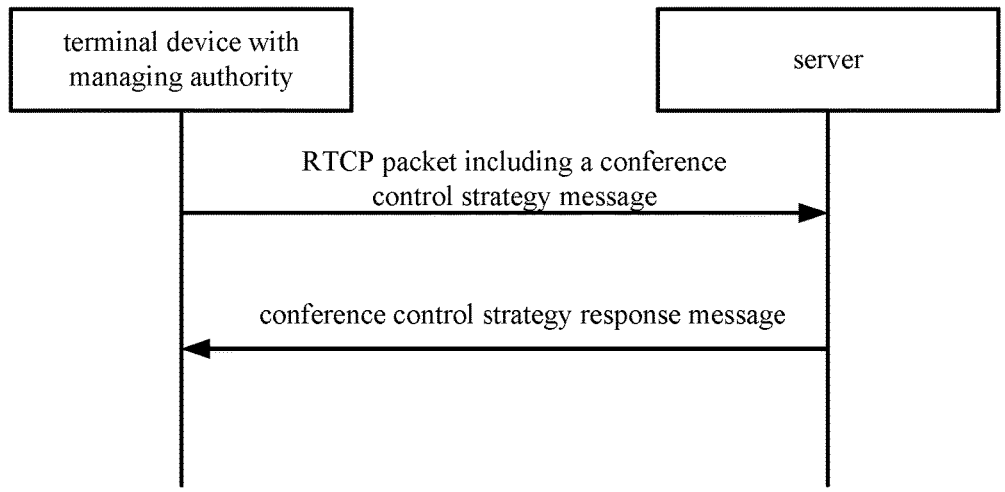
FIG. 9 is a schematic diagram of interaction in a system for controlling a telepresence conference according to an embodiment of the present disclosure.

A system for controlling a telepresence conference is provided according to an embodiment of the present disclosure. The system includes at least the above server and the above terminal device with managing authority. FIG. 9 is a schematic diagram of interaction in a system for controlling a telepresence conference according to an embodiment of the present disclosure. Referring to FIG. 9, the system includes a server and a terminal device with managing authority. The terminal device having managing authority transmits an RTCP packet containing a conference control strategy message to the server. After receiving the RTCP packet, the server transmits a conference control strategy response message to the terminal device having managing authority, while controlling other terminal devices participating in the conference based on the RTCP packet.

It may be understood by those skilled in the art that, all or some of the steps of the above embodiments can be implemented in hardware or in programs instructing related hardware. The programs may be stored in a computer readable storage medium such as a Read Only Memory, a magnetic disk or an optical disk.

The above are only the preferred embodiments of the present disclosure and are not intended to limit the present disclosure. Any changes, equivalent substitutions, improvements and the like made within the spirit and principle of the present disclosure are all contained in the scope of protection of the present disclosure.

What is claimed is:

1. A method for controlling a telepresence conference, comprising:
   receiving, by a server, a conference control strategy message transmitted by a terminal device with managing authority, wherein the conference control strategy message comprises geographical position information and role information of a conference control object, a media type of conference control content and a triggering condition for locking conference status;
   determining, by the server, a media stream message corresponding to the conference control object based on the geographical position information and the role information of the conference control object; and
   controlling, by the server, the media stream message corresponding to the conference control object based on the media type of the conference control content and the triggering condition for locking conference status.

2. The method according to claim 1, wherein before the controlling, by the server, the media stream message corresponding to the conference control object based on the media type of the conference control content and the triggering condition for locking conference status, the method comprises:

receiving, by the server, a media stream message transmitted by at least one terminal device, the media stream message comprising at least a 5-Tuple and a synchronization source identifier.

3. The method according to claim 2, wherein, in a case that a realtime transport protocol is multiplexed, the determining, by the server, the media stream message corresponding to the conference control object based on the geographical position information and the role information of the conference control object comprises:
   acquiring, by the server, a capture identifier of the media stream message corresponding to the conference control object based on the geographical position information and the role information of the conference control object in the conference control strategy message;
   acquiring, by the server, a synchronization source identifier of the media stream message corresponding to the conference control object based on a session description protocol and the capture identifier of the media stream message corresponding to the conference control object; and
   determining, by the server, the media stream message corresponding to the conference control object based on the synchronization source identifier of the media stream message corresponding to the conference control object and the synchronization source identifier of the received media stream message.

4. The method according to claim 2, wherein, in a case that a realtime transport protocol is not multiplexed, the determining, by the server, the media stream message corresponding to the conference control object based on the geographical position information and the role information of the conference control object comprises:
   acquiring, by the server, a 5-Tuple corresponding to the conference control object based on the geographical position information and the role information of the conference control object in the conference control strategy message; and
   determining, by the server, the media stream message corresponding to the conference control object based on the 5-Tuple corresponding to the conference control object and the 5-Tuple of the received media stream message.

5. The method according to claim 1, wherein after the receiving, by the server, the conference control strategy message transmitted by the terminal device with managing authority, the method comprises:
   transmitting, by the server, a conference control strategy response message to the terminal device with managing authority.

6. The method according to claim 1, wherein the conference control strategy message is transported in a realtime transport control protocol packet.

7. A method for controlling a telepresence conference, comprising:
   displaying, by a terminal device with managing authority, a conference control strategy option;
   generating, by the terminal device with managing authority, a conference control strategy message in response to an operation of a user, wherein the conference control strategy message comprises geographical position information and role information of a conference control object, a media type of conference control content and a triggering condition for locking conference status; and transmitting, by the terminal device with managing authority, the conference control strategy message to a server.

8. The method according to claim 7, wherein after the transmitting, by the terminal device with managing authority, the conference control strategy message to the server, the method comprises:
receiving, by the terminal device with managing authority, a conference control strategy response message transmitted by the server.

9. The method according to claim 7, wherein the conference control strategy message is transported in a realtime transport control protocol packet.

10. An apparatus for controlling a telepresence conference, comprising:
at least a processor; and
a memory storing program instructions, which, when executed by the at least one processor, configures the apparatus to:
receive a conference control strategy message transmitted by a terminal device with managing authority, wherein the conference control strategy message comprises geographical position information and role information of a conference control object, a media type of conference control content and a triggering condition for locking conference status;
determine a media stream message corresponding to the conference control object based on the geographical position information and the role information of the conference control object; and
control the media stream message corresponding to the conference control object based on the media type of the conference control content and the triggering condition for locking conference status.

11. The apparatus according to claim 10, wherein the program instructions, when executed by the at least one processor, further configure the apparatus to:
receive a media stream message transmitted by at least one terminal device, the media stream message comprising at least a 5-Tuple and a synchronization source identifier.

12. The apparatus according to claim 11, wherein, in a case that a realtime transport protocol is multiplexed, the determining the media stream message corresponding to the conference control object based on the geographical position information and the role information of the conference control object comprises:
acquiring a capture identifier of the media stream message corresponding to the conference control object based on the geographical position information and the role information of the conference control object in the conference control strategy message;
acquiring a synchronization source identifier of the media stream message corresponding to the conference control object based on a session description protocol and the capture identifier of the media stream message corresponding to the conference control object; and
determining the media stream message corresponding to the conference control object based on the synchronization source identifier of the media stream message corresponding to the conference control object and the synchronization source identifier of the received media stream message.

13. The apparatus according to claim 11, wherein, in a case that a realtime transport protocol is not multiplexed, the determining the media stream message corresponding to the conference control object based on the geographical position information and the role information of the conference control object comprises:
acquiring a 5-Tuple corresponding to the conference control object based on the geographical position information and the role information of the conference control object in the conference control strategy message; and
determining the media stream message corresponding to the conference control object based on the 5-Tuple corresponding to the conference control object and the 5-Tuple of the received media stream message.

14. The apparatus according to claim 10, wherein the program instructions, when executed by the at least one processor, further configure the apparatus to:
transmit a conference control strategy response message to the terminal device with managing authority.

15. The apparatus according to claim 10, wherein the conference control strategy message is transported in a realtime transport control protocol packet.

* * * * *